US012785928B2

(12) United States Patent
Peng et al.

(10) Patent No.: US 12,785,928 B2
(45) Date of Patent: Nov. 3, 2026

(54) SECURE TWO-PARTY DATA COMPARISON METHOD AND APPARATUS BASED ON SCALE TRANSFORMATION

(71) Applicant: Beihang University, Beijing (CN)

(72) Inventors: Shizhao Peng, Beijing (CN); Haogang Zhu, Beijing (CN); Weihu Song, Beijing (CN)

(73) Assignee: Beihang University, Beijing (CN)

( * ) Notice: Subject to any disclaimer, the term of this patent is extended or adjusted under 35 U.S.C. 154(b) by 34 days.

(21) Appl. No.: 18/989,185

(22) Filed: Dec. 20, 2024

(65) Prior Publication Data

US 2026/0088973 A1 Mar. 26, 2026

(30) Foreign Application Priority Data

Sep. 26, 2024 (CN) ......................... 202411354021.3

(51) Int. Cl.
*H04L 9/06* (2006.01)
*G06F 21/60* (2013.01)
*H04L 9/08* (2006.01)

(52) U.S. Cl.
CPC .......... *H04L 9/0631* (2013.01); *G06F 21/602* (2013.01); *H04L 9/0869* (2013.01); *H04L 2209/46* (2013.01)

(58) Field of Classification Search
CPC . H04L 9/0631; H04L 9/0869; H04L 2209/46; G06F 21/602
See application file for complete search history.

(56) References Cited

U.S. PATENT DOCUMENTS

2019/0394039 A1* 12/2019 Higo .................... H04L 9/3236
2024/0340172 A1* 10/2024 Zhu ....................... H04L 9/0861

OTHER PUBLICATIONS

Zahur, Samee, et al., "Obliv-C: A Language for Extensible Data Oblivious Computation," University of Virginia.
Mohassel, Payman, et al., "ABY3: A Mixed Protocol Framework for Machine Learning," CCS '18 Proceedings of the 2018 ACM SIGSAC Conference on Computer and Communications Security (2018).

(Continued)

*Primary Examiner* — Baotran N To
(74) *Attorney, Agent, or Firm* — Thomas | Horstemeyer, LLP

(57) ABSTRACT

Provided are a secure two-party data comparison method and apparatus based on scale transformation. The method includes: transmitting, by a computation requesting party, a two-party data comparison request to two participant nodes; performing, by each participant node, scale transformation and linear scaling on private data locally after receiving the two-party data comparison request, to obtain an encrypted vector; determining, by each participant node, a real number locally using a secure two-party dot product protocol based on the local encrypted vector, and sharing the real number with the other participant node; determining, by each participant node, a comparison sign based on the obtained real number and transmitting the comparison sign to the computation requesting party; and determining, by the computation requesting party, a comparison result of the private data of the two participant nodes based on the comparison signs transmitted by the two participant nodes.

11 Claims, 5 Drawing Sheets

(56) References Cited

OTHER PUBLICATIONS

Van Gils, Nick J., "Master's Thesis—Multiparty Computation in Haskell: From MPyC to hMPC," Eindhoven University of Technology (2024).
Wagh, Sameer, et al., "SecureNN: 3-Party Secure Computation for Neural Network Training," Proceedings on Privacy Enhancing Technologies, vol. 3 (2019), pp. 26-49.
Zhao, Bowen, et al., "SOCI: A Toolkit for Secure Outsourced Computation on Integers," IEEE Transactions on Information Forensics and Security, vol. 17 (2022), pp. 3637-3648.
Garay, Juan, et al., "Practical and Secure Solutions for Integer Comparison," 10th International Conference on Practice and Theory in Public-Key Cryptography, Beijing, China (2007).
Couteau, Geoffroy, "New Protocols for Secure Equality Test and Comparison," Applied Cryptography and Network Security: 16th International Conference, ACNS 2018, Leuven, Belgium (2018), pp. 303-320.

* cited by examiner

SECURE TWO-PARTY DATA COMPARISON METHOD AND APPARATUS BASED ON SCALE TRANSFORMATION

CROSS REFERENCE TO RELATED APPLICATION

This patent application claims the benefit and priority of Chinese Patent Application No. 202411354021.3, filed with the China National Intellectual Property Administration on Sep. 26, 2024, the disclosure of which is incorporated by reference herein in its entirety as part of the present application.

TECHNICAL FIELD

The present disclosure relates to the field of data security, and in particular, to a secure two-party data comparison method and apparatus based on scale transformation.

BACKGROUND

With the epochal emergence of cloud computing and artificial intelligence generic large model technology, the world has officially entered the "data-driven" information intelligence era, and data has become an important strategic resource among countries, institutions, and enterprises. Correspondingly, due to the neglect and abuse of data privacy, incidents of privacy data leakage have frequently occurred in recent years. For example, in May 2016, the American professional social networking website LinkedIn announced that the email addresses and passwords of nearly 167 million users had been leaked and publicly organized for sale by a hacker group; and in March 2018, the American social media Facebook admitted that personal information of nearly 50 million users had been illegally collected and leaked by a personality test software. For this series of emergencies, in order to avoid the continued negative impact and economic losses caused by privacy leakage, many countries have enacted and implemented corresponding privacy-preserving regulations and laws. However, it is far from enough to restrict the occurrence of privacy leakage from the legislative level. In the face of diverse service scenarios and challenges, introducing some privacy computing technologies from the technical level is necessary and cannot be ignored.

SUMMARY

An objective of the present disclosure is to provide a secure two-party data comparison method and apparatus based on scale transformation, which can improve the security of private data in a two-party data comparison process.

To achieve the above objective, the present disclosure provides the following solutions.

According to a first aspect, the present disclosure provides a secure two-party data comparison method based on scale transformation, including:

- transmitting, by a computation requesting party, a two-party data comparison request to a first participant node and a second participant node, where the first participant node holds first private data and the second participant node holds second private data;
- after the first participant node and the second participant node receive the two-party data comparison request, performing, by the first participant node, scale transformation on the first private data to obtain a first multi-dimensional vector, and performing, by the second participant node, scale transformation on the second private data to obtain a second multi-dimensional vector;
- performing, by the first participant node, linear scaling on the first multi-dimensional vector to obtain a first encrypted vector, and performing, by the second participant node, linear scaling on the second multi-dimensional vector to obtain a second encrypted vector;
- determining, by the first participant node and the second participant node, a first real number and a second real number based on the first encrypted vector and the second encrypted vector respectively according to a secure two-party dot product protocol, where a sum of the first real number and the second real number is equal to a dot product of the first encrypted vector and the second encrypted vector; and sharing, by the first participant node and the second participant node, the first real number and the second real number;
- determining, by the first participant node and the second participant node, a first comparison sign and a second comparison sign respectively based on the first real number and the second real number, and transmitting the first comparison sign and the second comparison sign to the computation requesting party respectively; and
- determining, by the computation requesting party, a comparison result of the first private data and the second private data based on the first comparison sign and the second comparison sign.

According to a second aspect, the present disclosure provides a secure two-party data comparison apparatus based on scale transformation, including: a computation requesting party, a first participant node, and a second participant node. The first participant node holds first private data, and the second participant node holds second private data.

The computation requesting party is configured to transmit a two-party data comparison request to the first participant node and the second participant node.

The first participant node is configured to: perform scale transformation on the first private data to obtain a first multi-dimensional vector; perform linear scaling on the first multi-dimensional vector to obtain a first encrypted vector; and determine a first real number based on the first encrypted vector according to a secure two-party dot product protocol and share the first real number with the second participant node.

The second participant node is configured to: perform scale transformation on the second private data to obtain a second multi-dimensional vector; perform linear scaling on the second multi-dimensional vector to obtain a second encrypted vector; and determine a second real number based on the second encrypted vector according to the secure two-party dot product protocol and share the second real number with the first participant node, where a sum of the first real number and the second real number is equal to a dot product of the first encrypted vector and the second encrypted vector.

The first participant node is further configured to determine a first comparison sign based on the first real number and transmit the first comparison sign to the computation requesting party.

The second participant node is further configured to determine a second comparison sign based on the second real number and transmit the second comparison sign to the computation requesting party.

The computation requesting party is further configured to determine a comparison result of the first private data and the second private data based on the first comparison sign and the second comparison sign.

According to specific embodiments provided in the present disclosure, the present disclosure discloses the following technical effects:

The present disclosure provides a secure two-party data comparison method and apparatus based on scale transformation. The processes of scale transformation and linear scaling on the private data are both processes performed locally at the two participant nodes, and do not involve any interaction of information between the two parties, causing no exposure risks to the private data. The two participant nodes determine the first real number and the second real number based on the secure two-party dot product protocol and share the first real number and the second real number. Therefore, any participant node can obtain only two real numbers, but cannot infer the private data of the other participant node based on the two real numbers. The two participant nodes determine the first comparison sign and the second comparison sign respectively based on the first real number and the second real number, and the sign conversion only serves to retain the consistency of the signs, but does not involve any interaction between values of the two parties. Therefore, the processes do not leak any original input information, and the process of summarizing the results by the computation requesting party does not involve the interaction behavior of any participant node, causing no information leakage, thereby improving the security of the private data in the two-party data comparison process.

BRIEF DESCRIPTION OF THE DRAWINGS

To describe the technical solutions in the embodiments of the present disclosure or in the prior art more clearly, the following briefly describes the accompanying drawings required for the embodiments. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

Figure 1:
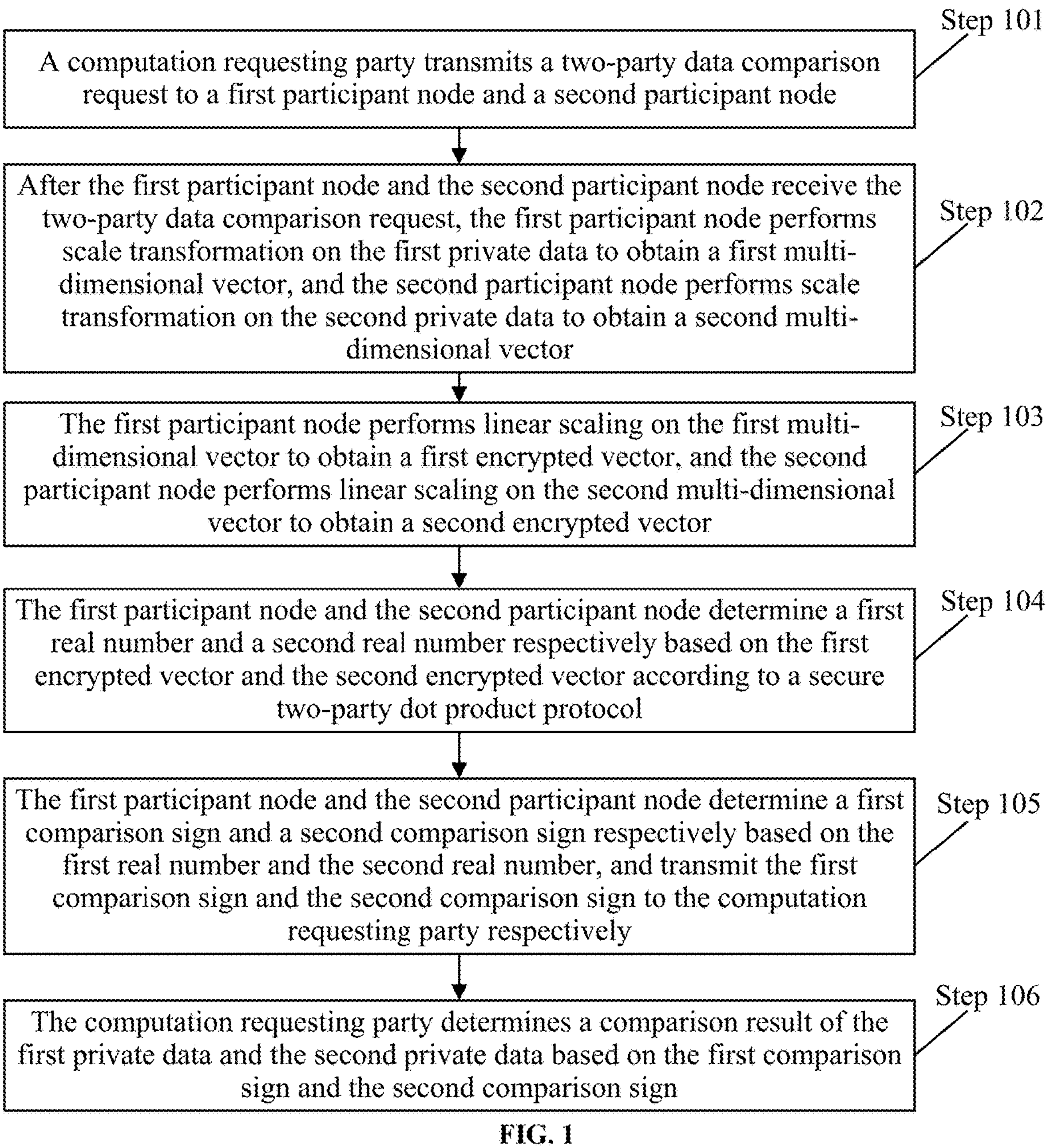
FIG. 1 is a flowchart of a secure two-party data comparison method based on scale transformation according to an embodiment of the present disclosure.

The technical solutions in the embodiments of the present disclosure are clearly and completely described below with reference to the drawings in the embodiments of the present disclosure. Apparently, the described embodiments are only some rather than all of the embodiments of the present disclosure. All other embodiments obtained by a person of ordinary skill in the art based on the embodiments of the present disclosure without creative efforts shall fall within the protection scope of the present disclosure.

The related terms are introduced first:

Semi-honest model is a specific protocol assuming that all computation participants honestly perform privacy-preserving computation and perform each procedure in strict accordance with the protocol, but there are some risks caused by a corrupt participant who attempts to infer privacy of another participant based on an intermediate or final result obtained in a protocol execution process.

Secure two-party dot product protocol: it is assumed that there are two participants distrustful of each other, each participant holds secret input vectors x and y, and jointly executes a two-party dot product protocol $f(x, y)=\text{Output}(v_1, v_2)=x\odot y$, where each participant finally obtains corresponding outputs $v_1$ and $v_2$ the outputs meet $v_1+v_2=x\odot y$. Throughout a computation process, each participant node knows only input and output data involved in the computation process of the participant, and cannot obtain any intermediate computation result of another participant node.

Secure two-party data comparison protocol: it is assumed that there are two participants distrustful of each other, each participant holds a secret real number x and y as an input, the two participants jointly execute a two-party data comparison protocol $f(x, y)\mapsto(\delta_a, \delta_b)$, and $\delta_a=\delta_b=\text{Sign}(\sigma)=\text{Output}\{-1, 0, 1\}$. Finally, each participant learns the magnitude relationship between each other, where "−1" represents $x<y$, "0" represents $x=y$, and "1" represents $x>y$. Throughout a computation process, each participant node knows only input and output data involved in the computation process of the participant, and cannot obtain any intermediate computation result of another participant node.

Secure data obfuscation technology is a data protection method for protecting an intermediate result of multi-party secure computation. A computation result is randomly split through the proper construction of the computation protocol, so that outputs of multiple parties jointly constitute a real target computation result in a linear combination, to finally achieve the data privacy-preserving effect of one password one time.

Privacy computing technology: It refers to a series of information security technologies that break down data silos, collaborate with multiple parties in computing, and finally implement complex computation and modeling analysis of multi-source data without exposing the privacy of the private data of all parties, so as to ensure that the data elements are "available and invisible" in the circulation and fusion process.

The "secure two-party data comparison problem" originated from the Millionaires' Problem proposed in 1982 by Academician Andrew Yao. The problem is that two millionaires compare who is richer without revealing the wealth value of each other. Academician Andrew Yao proposed an initial research solution for this type of security comparison problem, i.e., a secure two-party computation technology based on a garbled circuit. In recent years, researchers have proposed a series of more secure, efficient and practical solutions to the problem, and have widely used the technology in scenarios such as privacy-preserving machine learning, cloud computing, and distributed large model training. For example, in the data pre-processing and cleaning process, data alignment operations usually need to be performed through privacy comparison; in the large model training stage, the maximum pooling layer in the neural network layer also involves the secure multi-party comparison problem; and in the scenario of multi-party data classification using a decision tree model and a K-Nearest Neighbor (KNN) model, the privacy comparison technology is also frequently used for data sorting and screening. Existing technical solutions for secure comparison include the following:

1) The Obliv-C and ABY3 garbled circuit frameworks developed by Zahur, Hussain, Mohassel, et al. protect circuit outputs corresponding to their respective inputs by transforming mathematical operations (addition and multiplication) into Boolean circuits and in combination with cryptographic technologies such as secure shuffling and oblivious transfer. The Obliv-C and ABY3 frameworks are both universal secure two-party computation solutions based on garbled circuits and can support secure two-party data comparison. However, such solutions require the construction of a large number of circuits, resulting in high computational and space complexity, low computational efficiency, and insufficient practicality.
2) The MPyC and SecureNN frameworks developed by Schoenmakers, Wagh et al. use the idea of Shamir secret sharing to hide secret values. They randomly split each secret value into multiple slices interacting through each participant, and reconstruct and combine the slices using a threshold number of nodes when needed, to solve the difference between the values to be compared. The MPyC and SecureNN frameworks are based on the idea of secret sharing to hide the difference between the values compared by two parties. However, such solutions involve a large number of message exchanges between multiple parties, which may lead to the problem of inefficient communication.
(3) Lin, Zhao et al. proposed a SOCI framework to solve the problem of ciphertext comparison of large integers in outsourcing scenarios by combining the ElGamal homomorphic encryption solution and the comparison method of string set intersections, comparing the 0 and 1 encoding of the two parties, and combining with Paillier primitive. The problem adopts the public key to encrypt, computes the ciphertext, and then decrypts the result using the private key. Although the solution ensures the security of the computation result, due to the complexity of the ciphertext computation and its dependence on a third-party cloud platform for computation, there is the problem of large computation storage and communication overhead costs, as well as the risk of data leakage once the third-party cloud platform is attacked.
(4) Veugen, Damgard et al. proposed a method for converting a particular secret polynomial sharing into bit sharing, which implements the secure two-party difference computation and comparison by calling the GSV07 secret sharing protocol. Although the solution reduces the computational complexity compared to the homomorphic solution, due to the overprotection for the output results, the solution reduces the efficiency of the final protocol execution and introduces more computational costs additionally.

Most of the above solutions adopt the method in which one party computes results and then gives the results to the other party to obtain the final comparison result, and therefore all have the problem of reliability and fairness of the results. Once the party that has the priority to obtain the comparison result withdraws from the protocol early or gives an incorrect result, the final correct comparison result cannot be obtained.

The present disclosure mainly focuses on the secure two-party data comparison problem, to implement an efficient, secure, and reliable private nonlinear numerical computation method. Therefore, based on the above objective, the present disclosure aims to solve the following technical problems:

(1) Existing solutions involving the secure two-party data comparison problem mostly use computational frameworks developed on the basis of traditional basic cryptographic primitives such as homomorphic encryption, secret sharing, and garbled circuit, which rely on ciphertext computations of extremely high time and space complexity, leading to the problem of low practicability and insufficient efficiency.
(2) Existing outputs involving the secure two-party data comparison protocol does not have fairness and consistency, and their computation results are usually that one party has the priority to obtain the comparison result before informing the other party of the comparison result. This model has a constraint problem that the output is overly dependent on whether one party is trustworthy.
(3) Existing application scenarios involving secure two-party data comparison solutions mostly rely on outsourced cloud service systems, while the third-party cloud service computing platform that is not highly credible or attacked by malicious nodes may cause the leakage of intermediate computation results or key secret key information, which further triggers the security risks of privacy leakage of the original data party.

To make the above objectives, features, and advantages of the present disclosure more obvious and easy to understand, the present disclosure will be further described in detail with reference to the accompanying drawings and specific implementations.

In an exemplary embodiment, as shown in FIG. 1, a secure two-party data comparison method based on scale transformation is provided. The method includes the following steps 101 to 106.

Step 101: A computation requesting party transmits a two-party data comparison request to a first participant node and a second participant node. The first participant node holds first private data, and the second participant node holds second private data.

Step 102: After the first participant node and the second participant node receive the two-party data comparison request, the first participant node performs scale transformation on the first private data to obtain a first multi-dimensional vector, and the second participant node performs scale transformation on the second private data to obtain a second multi-dimensional vector.

Step 103: The first participant node performs linear scaling on the first multi-dimensional vector to obtain a first encrypted vector, and the second participant node performs linear scaling on the second multi-dimensional vector to obtain a second encrypted vector.

Step 104: The first participant node and the second participant node determine a first real number and a second real number respectively based on the first encrypted vector and the second encrypted vector according to a secure two-party dot product protocol.

A sum of the first real number and the second real number is equal to a dot product of the first encrypted vector and the second encrypted vector. The first participant node and the second participant node share the first real number and the second real number.

Step 105: The first participant node and the second participant node determine a first comparison sign and a second comparison sign respectively based on the first real number and the second real number, and transmit the first comparison sign and the second comparison sign to the computation requesting party respectively.

Step 106: The computation requesting party determines a comparison result of the first private data and the second private data based on the first comparison sign and the second comparison sign.

The secure two-party data comparison method based on scale transformation provided in the present disclosure is applied to a private set intersection scenario of a distributed database, a training scenario of a distributed large model, or a scenario of multi-party data classification using a decision tree model.

In the private set intersection scenario of a distributed database, the first participant node is a computer device owning a first private set, the second participant node is a computer device owning a second private set, the first private data is data in the first private set, and the second private data is data in the second private set. The computation requesting party determines an intersection of the first private set and the second private set based on a comparison result of the first private data and the second private data.

In an exemplary example, in the financial field, it is usually necessary to keep records of deposits, loans, and payroll statements of customer groups in different banking institutions, to assess the creditworthiness of the customers and grade the customers. The prerequisite for solving this problem is that associated users needs to be found through the joint intersection of two databases before data matching can be performed. In addition, because different banking institutions have their own confidential database systems due to supervision and security policies, how to find common customers distributed in multi-party bank databases without leaking their own private data is a typical private set intersection problem.

Here it is assumed that a private data table held by bank A is $Table_A=\{ID_A, \omega_{A1}, \ldots, \omega_{Am}\}$ and a private data table held by bank B is $Table_B=\{ID_B, \omega_{B1}, \ldots, \omega_{Bn}\}$. $ID_A$ and $ID_B$ represent a data set containing user identities (ID) of bank A and bank B respectively, and $\omega_{Am}$ and $\omega_{Bn}$ represent a remaining financial attribute feature of a customer sample of bank A and bank B respectively. Because the objective is to jointly find common customers, it is only necessary to find the same user ID from the data columns $\psi_A=\{ID_{A1}, ID_{A2}, \ldots, ID_{Am}\}$ and $\psi_B=\{ID_{B1}, ID_{B2}, \ldots, ID_{Bn}\}$ containing user ID information in the two private data tables, i.e., acquiring a private set intersection of the sets of user IDs. Due to data privacy constraints, the two participants are prohibited from leaking any information of their own local private data columns. Therefore, the secure two-party data comparison method is used here to find out elements with the same value in the set $\psi_A$ and $\psi_B$ to acquire the intersection of the two data columns.

The specific process is as follows: First, the first participant node (bank A) uniformly converts string type data containing user ID information in its set $\psi_A$ into a hash value $\{\psi_A \mapsto H_A|H_{Ai}=hash(ID_{Ai}), i=1\sim m\}$, and the second participant node (bank B) operates in a similar way to obtain $\{\psi_B \mapsto H_B|H_{Bi}=hash(ID_{Bj}), j=1\sim n\}$; then the first participant node performs secure two-party numerical value comparison on element $H_{Ai}$ in its own set and element $H_{Bj}$ in the second participant node, where the secure two-party data comparison method $S2PC(H_{Ai}, H_{Bj})$ based on scale transformation is called hereto obtain a determining result $\delta_a(i, j)=\delta_b(i, j)=Sign(H_{Ai}-H_{Bj})$ of whether the two values are equal while protecting the security of private data of each party; and finally, the first participant node and the second participant node can obtain result matrices $S_a$ and $S_b$ after performing pairwise comparison on all the elements by calling the secure two-party data comparison protocol nm, where the index $(i, j)=\{S_a(i, j)=0$ or $S_b(i, j)=0|i=1\sim m, j=1\sim n\}$ corresponding to the zero element in the result matrix $S_a$ or $S_b$ represents that an $i^{th}$ user of the first participant node and a $j^{th}$ user of the second participant node are the same person. Similarly, the index set $ID_{intersection}=\{(i, j)|S_a(i, j)=0$ && $S_b(i, j)=0\}$ of all the zero elements represents the common users corresponding to the two-party banks.

In the training scenario of a distributed large model, the first participant node is a computer device owning a first training sample set, the second participant node is a computer device owning a second training sample set, the first private data is a sample in the first training sample set, and the second private data is a sample in the second training sample set. The computation requesting party performs data alignment on the sample in the first training sample set and the sample in the second training sample set based on a comparison result of the first private data and the second private data, to train the distributed large model based on the samples after data alignment.

The specific process is as follows: In the training scenario of a distributed large model, data matching is performed first, which is essentially the same as that in the above problem of acquiring the intersection in the distributed database, both requiring "data alignment" on different data set samples first. The "data alignment" process itself is to query the same samples scattered in different data sets and then splice the data. The process of querying the same data samples is an intersection process based on the samples ID, except that the input data becomes a set $ID_a$ of sample IDs from a first participant dataset and a set $ID_b$ of sample IDs from a second participant dataset. IDs of the samples can be any typical numerical data with identification significance such as a common name or identification number.

In the scenario of multi-party data classification using a decision tree model, the first participant node is a computer device owning a first to-be-classified data set, the second participant node is a computer device owning a second to-be-classified data set, the first private data is data in the first to-be-classified data set, and the second private data is data in the second to-be-classified data set. The computation requesting party classifies the data in the first to-be-classified data set and the data in the second to-be-classified data set based on a comparison result of the first private data and the second private data.

The specific process is as follows: In the decision tree model, the call of privacy comparison protocol is often used in a result prediction process. The prediction process is illustrated here using the classic binary decision tree CART as an example, where the first participant holds parameters (including split features and thresholds of leaf nodes) of the decision tree model, T is used to represent the decision tree model, and $T_i$ is used to represent an $i^{th}$ node of the decision tree. If the node is a leaf node, $$L_{pre}^{(i)}$$

is used to represent a predicted label result. Conversely, $$f_T^{(i)}$$

is used to represent split features stored by the node, and $$\theta_T^{(i)}$$

is used to represent thresholds stored by the node. If x is used to represent a data sample, its ith eigenvalue is recorded as $\omega_i$. The prediction process of the decision tree algorithm is to securely compare the threshold $$\theta_T^{(i)}$$

at the current node with the corresponding eigenvalue $$\omega_i = x\left[f_T^{(i)}\right]$$

in the data sample in a top-down order, and to select a different branch based on the comparison result to continue moving forward, until the sample reaches the leaf node, to obtain the final prediction result $$L_{pre}^{(i)}.$$

In addition, the secure two-party data comparison method based on scale transformation provided in the present disclosure can be further applied to a secret auction scenario for an item. In this scenario, the computation requesting party is an institution or organization that organizes the auction, the first participant node and the second participant node are the buyers participating in the auction, the first private data is the bid of the first participant node, and the second private data is the bid of the second participant node. In an auction process, the bids of the buyers participating in the auction are private data, which are not disclosed to the public. The secure two-party data comparison method based on scale transformation provided in the present disclosure is used to compare the bids of the two parties, and the computation requesting party decides the belonging of the item based on the bids of the two parties, which improves the confidentiality of the auction of the item.

For most multi-party computations, the process of achieving secure computation usually includes multi-step interactions. How to ensure the security of an intermediate result is an inevitable problem. For example, when a product of two-party matrices is used as an intermediate computation result, regardless of whether the first participant node or the second participant node obtains a result of a final matrix, data information of the other party may be inferred reversely. Therefore, both the security of the original data input and the security of the intermediate computation result need to be ensured in a privacy computation process.

Figure 2:
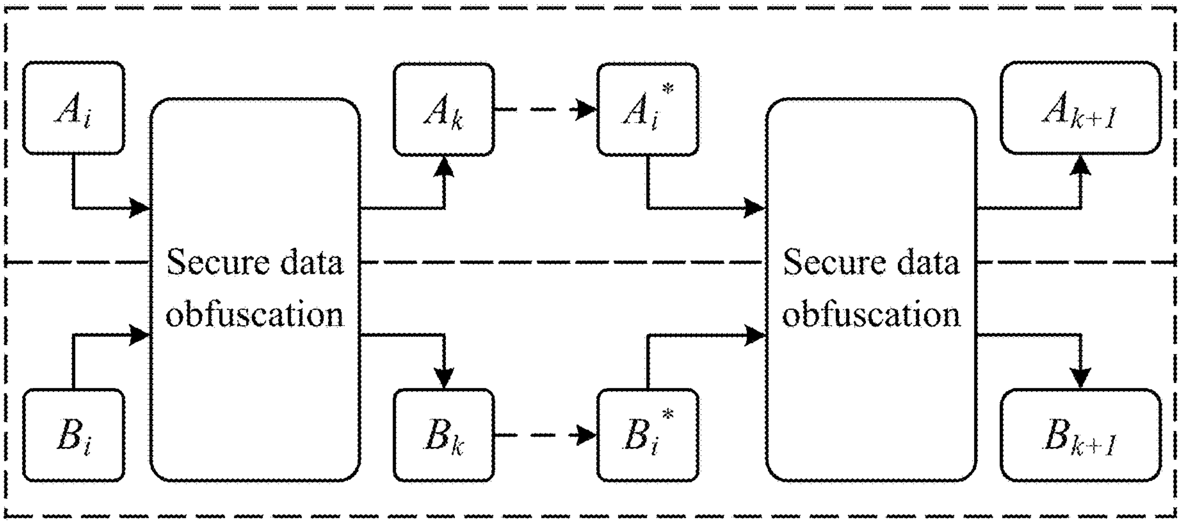
FIG. 2 is a principle diagram of a secure data obfuscation technology according to an embodiment of the present disclosure.

To solve this problem, the present disclosure provides a secure data disguising technology (SDDT) in which an arbitrary multi-item operation is disassembled into a new multi-item addition for obfuscating and computing a result of an intermediate value. To illustrate its principle more easily, a basic two-party operation type is exemplified in the present disclosure, and its principle is shown in FIG. 2. It is assumed that $S_k=F_k(A_i, B_i)$, where $F_k$ is a target computation function at step k, $A_i$ is private input data belonging to the first participant node at step k, $B_i$ is private input data belonging to the second participant node at step k, and $S_k$ is an intermediate result at step k. When executing step k of the multi-party secure computation protocol, the intermediate result $S_k$ will strictly follow the following constraints: the first participant node only knows the computation result $A_k$ belonging to itself and the second participant node only knows its result $B_k$, and $A_k+B_k=S_k$. Formula $[A_i:B_i]\rightarrow[A_k:B_k|A_k+B_k=F_k(A_i, B_i)]$ represents the process of transferring intermediate values, where the first participant node and the second participant node are not allowed to exchange information about data of each other throughout the process, including $A_k$ and $B_k$ obtained after the intermediate computation result is split. Similarly, for step k+1, its inputs $$A_i^* \text{ and } B_i^*$$

are formed by transferring the outputs $A_k$ and $B_k$ of the first participant node and the second participant node at step k, and $A^*_i=A_k$ and $$B_i^* = B_k,$$

whose outputs $A_{k+1}$ and $B_{k+1}$ meet $$S_{k+1} = F_{k+1}(A_i^*, B_i^*) = A_{k+1} + B_{k+1}.$$

The first participant node knows only the result of the computation $A_{k+1}$ which belongs to itself and the second participant node knows only its result $B_{k+1}$. Therefore, as long as it is ensured that the intermediate value is split into two random data items at each step of the computation and stored in the two computation participants, it can be ensured that none of the parties can reversely infer the original data items from this disguised data, which makes the whole privacy computation procedure with a high level of security.

In a specific example, a secure two-party data comparison (S2PC) protocol, a secure two-party dot product (S2PDP) protocol, and a secure two-party subtraction (S2PS) protocol are involved. The present disclosure does not use the secure two-party subtraction protocol in the secure two-party data comparison method, but may use the secure two-party subtraction protocol based on an application scenario in actual application. The three protocols are separately described below:

(i) Secure Two-Party Data Comparison Protocol

Figure 3:
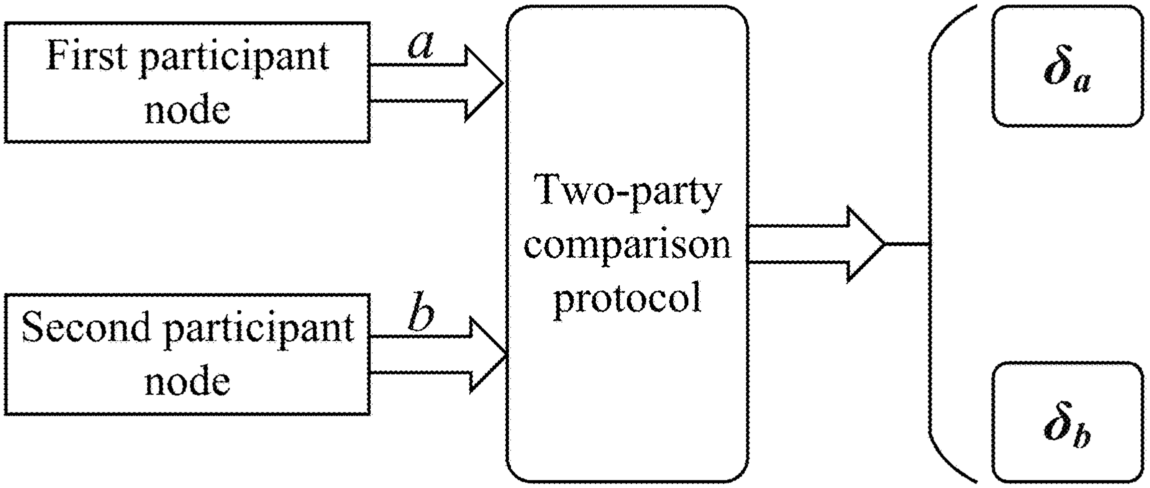
FIG. 3 is a schematic diagram of a secure two-party data comparison problem according to an embodiment of the present disclosure.
Figure 4:
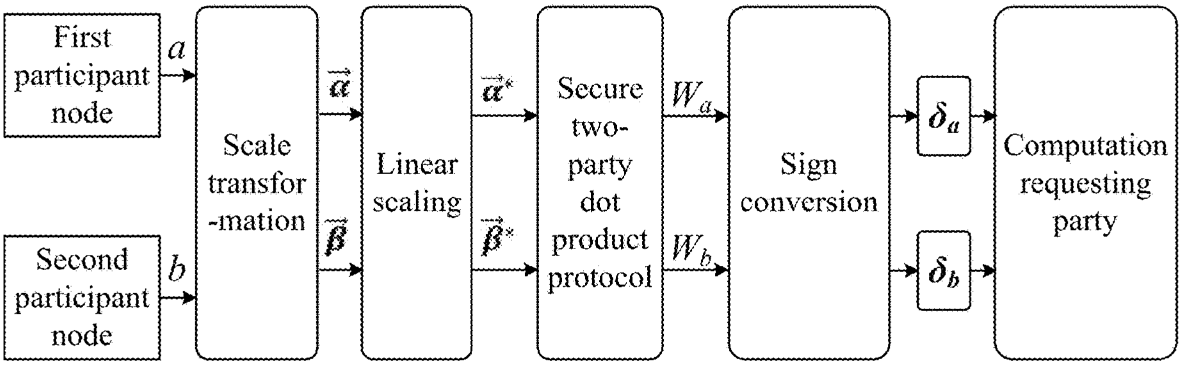
FIG. 4 is a flowchart of a secure two-party data comparison protocol according to an embodiment of the present disclosure.

The secure two-party data comparison problem usually occurs in application scenarios such as private set intersection in distributed databases, privacy ranking of online decision trees, and privacy-preserving deep neural networks, and has extensive research value. Therefore, without loss of generality, as shown in FIG. 3, let the first private data held by the first participant node in this protocol be $a\in R$, and the second private data held by the second participant node be $b\in R$. R is a set of real numbers, and the two participants jointly execute a two-party data comparison protocol $f_{S2PC}(a, b)=\mathrm{Sign}(a-b)=\delta_a=\delta_b$, and finally each computation participant node obtains its corresponding output indicator $\delta_a$, $\delta_b\in\{1, 0, -1\}$ and transmits the indicator to the computation requesting party to obtain its desired two-party data comparison result. During the computation process, each participant node can only obtain its own input and output information in the computation process, but cannot obtain an intermediate computation result or private data information held by the other participants. As shown in FIG. 4, the procedure is as follows:

Step 11: The first participant node performs scale transformation on the first private data a locally. A first multi-dimensional vector is obtained by transforming the first private data a from a one-dimensional value range $\{Dim_1: \alpha\in R\}$ to a random vector in a 2n-dimensional vector space $\{Dim_{2n}: a\in R^{2n}\}$ through the scale transformation. The process can be formalized as $a\mapsto\vec{\alpha}=(a_1, -1, a_2, -1, \ldots, a_n, -1)^T$ or $a\mapsto\vec{\alpha}=(a_1, 1, a_2, 1, \ldots, a_n, 1)^T$ or $a\mapsto\vec{\alpha}=(1, a_1, 1, a_2, 1, \ldots, a_n)^T$, where $$\sum_{i=1}^{n} a_i = a,$$

$\vec{\alpha}$ is the first multi-dimensional vector, $Dim_1$ represents the one-dimensional numerical range, and $Dim_{2n}$ represents the 2n-dimensional vector space.

Step 12: The second participant node performs scale transformation on the second private data locally. The process is represented as a process of transforming the second private data b from a one-dimensional value space $\{Dim_1: b\in R\}$ to a random vector in the 2n-dimensional vector space $\{Dim_{2n}: \beta\in R^{2n}\}$ to obtain a second multi-dimensional vector. The process can be formalized as $b\mapsto\vec{\beta}=(1, b_1, 1, b^2, \ldots, 1, b_n)^T$ or $b\mapsto\vec{\beta}=(1, -b_1, 1, -b_2, \ldots, 1, -b_n)^T$ or $b\mapsto\vec{\beta}=(-b_1, 1, -b_2, \ldots, 1, -b_n, 1)^T$, where $$\sum_{i=1}^{n} b_i = b,$$

and $\vec{\beta}$ is the second multi-dimensional vector.

In a specific example, $a\mapsto\vec{\alpha}=(a_1, -1, a_2, -1, \ldots, a_n, -1)^T$, and $b\mapsto\vec{\beta}=(1, b_1, 1, b_2, \ldots, 1, b_n)^T$.

In another specific example, $a\mapsto\vec{\alpha}=(a_1, 1, a_2, 1, \ldots, a_n, 1)^T$, and $b\mapsto\vec{\beta}=(1, -b_1, 1, -b_2, \ldots, 1, -b_n)^T$.

In another specific example, $a\mapsto\vec{\alpha}=(1, a_1, 1, a_2, 1, \ldots, a_n)^T$, and $b\mapsto\vec{\beta}=(-b_1, 1, -b_2, \ldots, 1, -b_n, 1)^T$.

Step 13: The first participant node secretly generates a large number $k=g^x$ locally, where k is the first largest number, g is a random prime number jointly determined through negotiation by the first participant node and the second participant node, falling within $[10^6\sim10^7]$, and x is a positive number randomly selected by the first participant node, with a value range of (1, 2). The first participant node then performs linear scaling on the first multi-dimensional vector $\vec{\alpha}$ and transforms the first multi-dimensional vector into a first encrypted vector $\vec{\alpha}^*$, which can be specifically expressed as $\vec{\alpha}^*=k\vec{\alpha}$.

Step 14: The second participant node secretly generates a large number $p=g^y$ locally, where p is the second largest number, and y is a positive number randomly selected by the second participant node, with a value range of (1, 2). The second participant node then performs linear scaling on the second multi-dimensional vector $\vec{\beta}$ and transforms the second multi-dimensional vector into a second encrypted vector $\vec{\beta}^*$, which can be specifically expressed as $\vec{\beta}^*=p\vec{\beta}$.

In a specific example, $(k, p)\in R^+$ or $(k, p)\in R^-$, $R^+$ is a set of integers, and $R^-$ is a set of complex numbers.

Step 15: The first participant node and the second participant node input the first encrypted vector $\vec{\alpha}^*$ and the second encrypted vector $\vec{\beta}^*$ respectively based on the S2PDP protocol, and split the computation result into two random real numbers: the first real number $W_a$ and the second real number $W_b$ based on a random obfuscation mechanism after the execution of the S2PDP protocol, where $W_a$, $W_b\in R$. The two real numbers are returned to the first participant node and the second participant node respectively, and the two real numbers meet the relation $f_{S2PDP}(\vec{\alpha}^*, \vec{\beta}^*)=W_a+W_b=\vec{\alpha}^*\odot\vec{\beta}^*$.

Step 16: The first participant node transmits the first real number $W_a$ to the second participant node, and the second participant node transmits the second real number $W_b$ to the first participant node.

Step 17: After receiving the second real number $W_b$, the first participant node computes a first sign test variable $\sigma_a$ using a formula $\sigma_a=W_a+W_b$. A first comparison sign result $\delta_a$ of the two-party data comparison is then obtained by a sign function $\mathrm{Sign}(\sigma_a)$ and transmitted to the computation requesting party. $\delta_a\in\{-1, 0, 1\}$, and $$\mathrm{Sign}(\sigma_a)=\begin{cases}-1, & \sigma_a<0\\ 0, & \sigma_a=0\\ 1, & \sigma_a>0\end{cases}.$$

Step 18: After receiving the first real number $W_a$, the second participant node computes a second sign test variable $\sigma_b$ using a formula $\delta_b=W_a+W_b$. A second comparison sign result $\delta_b$ of the two-party data comparison is then obtained by a sign function $\mathrm{Sign}(\sigma_b)$ and transmitted to the computation requesting party. $\delta_b\in\{-1, 0, 1\}$, and $$\mathrm{Sign}(\sigma_b) = \begin{cases} -1, & \sigma_b < 0 \\ 0, & \sigma_b = 0. \\ 1, & \sigma_b > 0 \end{cases}$$

Step 19: The computation requesting party receives the comparison results from the two parties and compares them, if $\delta_a=\delta_b$, it means that the computation is correct; otherwise, the computation is wrong, and the computation process is re-executed until it is correct.

The first encrypted vector $\vec{\alpha}^*$ and the second encrypted vector $\vec{\beta}^*$ obtained after the computation through steps 11 to 14 are used as inputs of the secure two-party dot product protocol in step 15. In this case, $W_a$ and $W_b$ outputted by the secure two-party dot product protocol meet the following relationship: $W_a+W_b=\vec{\alpha}^*\odot\vec{\beta}^*=(k\vec{\alpha})\odot(p\vec{\beta})=kp\times\vec{\alpha}\odot\vec{\beta}=kp\times(a-b)\propto(a-b)$, where $\propto$ represents that the positive and negative signs of the values on both sides of the equation are the same. Apparently, this is determined by $kp=g^x\cdot g^y$ in $W_a+W_b=kp\times(a-b)$ being always greater than 0. Therefore, the dot product result computed by the secure two-party dot product protocol $f_{S2PDP}(\vec{\alpha}^*, \vec{\beta}^*)=W_a+W_b$ has essentially the same positivity and negativity as that of the secure two-party subtraction protocol $f_{S2PS}(a, b)=a-b$.

The sign of the result $\sigma=W_a+W_b$ of the secure two-party dot product protocol is converted by using a sign function Sign( ) by the two parties through steps 16 to 18, which does not change the positivity or negativity of the inputs $(\sigma_a, \sigma_b)$ because the process is only a mapping $\sigma\mapsto\delta$ from a real number field to a discrete set $\{-1, 0, 1\}$.

Step 19 can further ensure the correctness of the computation by comparing the comparison results $\delta_a$ and $\delta_b$ of the two parties. Because when the two parties perform computations strictly based on the protocol procedure, the final output result $\sigma_a=\sigma_b$ is always valid, and the corresponding comparison sign result $\delta_a=\delta_b$ is also always valid. If it is not valid, it means that the computation is wrong.

Therefore, as a whole, the secure two-party data comparison protocol transforms the secure two-party data comparison problem $f_{S2PC}(a, b)=a-b$ into the secure two-party vector dot product problem $f_{S2PDP}(\vec{\alpha}^*, \vec{\beta}^*)$ having the same positivity and negativity as its difference between the two parties, and converts the final comparison result into a standard form of a sign variable $\delta\in\{-1, 0, 1\}$ based on the sign function Sign( ) to output.

The security of the S2PC protocol is analyzed below from two perspectives: process security and result security.

Process security: during the execution of the entire computation protocol, a participant obtains a set of all intermediate computation results from another participant and itself based on the interaction between the two parties, and it is considered to be in accordance with process security when the participant cannot obtain any private information originally inputted by the other party through the intermediate results. Result security: after the execution of the entire computation protocol, it is considered to be in accordance with result security when the participant cannot infer the private information inputted by the other party based on their respective outputs.

Process security: steps 11 to 14 are all computation processes locally executed at the first participant node and the second participant node, and neither the scale transformation nor the linear scaling involves any interaction of information between the two parties (particularly, for the disclosure parameter g, because the power parameters x and y of the exponential function are unknown to both parties, the disclosure parameter is also regarded as not having any effective interaction of information). Therefore, there is no risk of exposing the original input information. Step 15 is a collaborative computation process based on S2PDP and this step also does not cause the leakage of the original input information. For step 16, although the nodes of the two parties transmit the final two-party vector dot product results $W_a$ and $W_b$ respectively to each other, in this case, any participant knows the result of $f_{S2PDP}(\vec{\alpha}^*, \vec{\beta}^*)=W_a+W_b=kp\times(a-b)$. However, because any party only know one parameter of k or p, it is impossible to infer a true value of a−b based on the result, and therefore, it is impossible to further infer the input privacy information of the other party. For steps 17 to 18, because the sign conversion function only serves to retain the consistency of the numerical signs, and does not involve any interaction of the values of the two parties, the process does not leak any of the original input information. For step 19, because the process of summarizing the results by the computation requesting party does not involve the interaction behavior of any participant, there is no information leakage in this step either. Therefore, the S2PC protocol is in accordance with process security.

Result security: neither the first participant node nor the second participant node can reversely infer the original input information of the other party based on the final output information outputs$(P_i)=\{\delta_a$ or $\delta_b\}$. This is because $f_{S2PC}(a, b)=\delta_a$ or $\delta_b=\mathrm{Sign}(a-b)x$, and any participant only knows a sign mapping value $\delta\in\{-1, 0, 1\}$ corresponding to the comparison result, without any parsing information related to the input at all. Therefore, the protocol is in strict accordance with the result security of computation.

In conclusion, the S2PC protocol meets both process security and result security.

(ii) Secure Two-Party Dot Product Protocol

Figure 5:
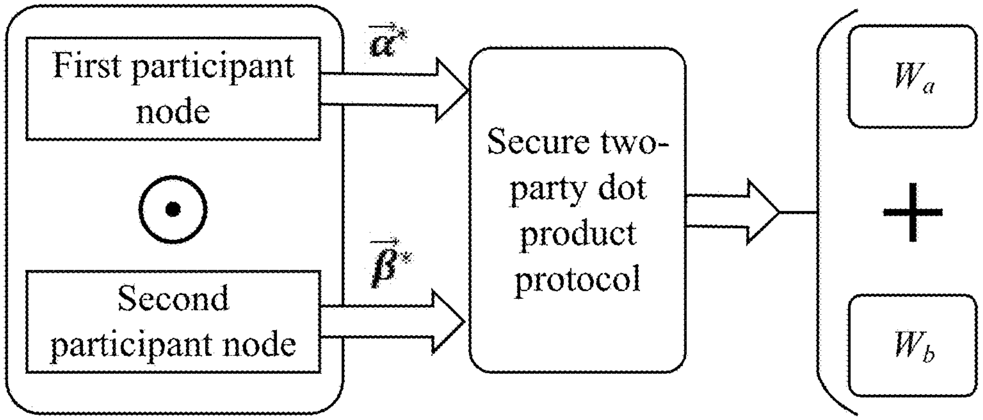
FIG. 5 is a schematic diagram of a secure two-party dot product problem according to an embodiment of the present disclosure.
Figure 6:
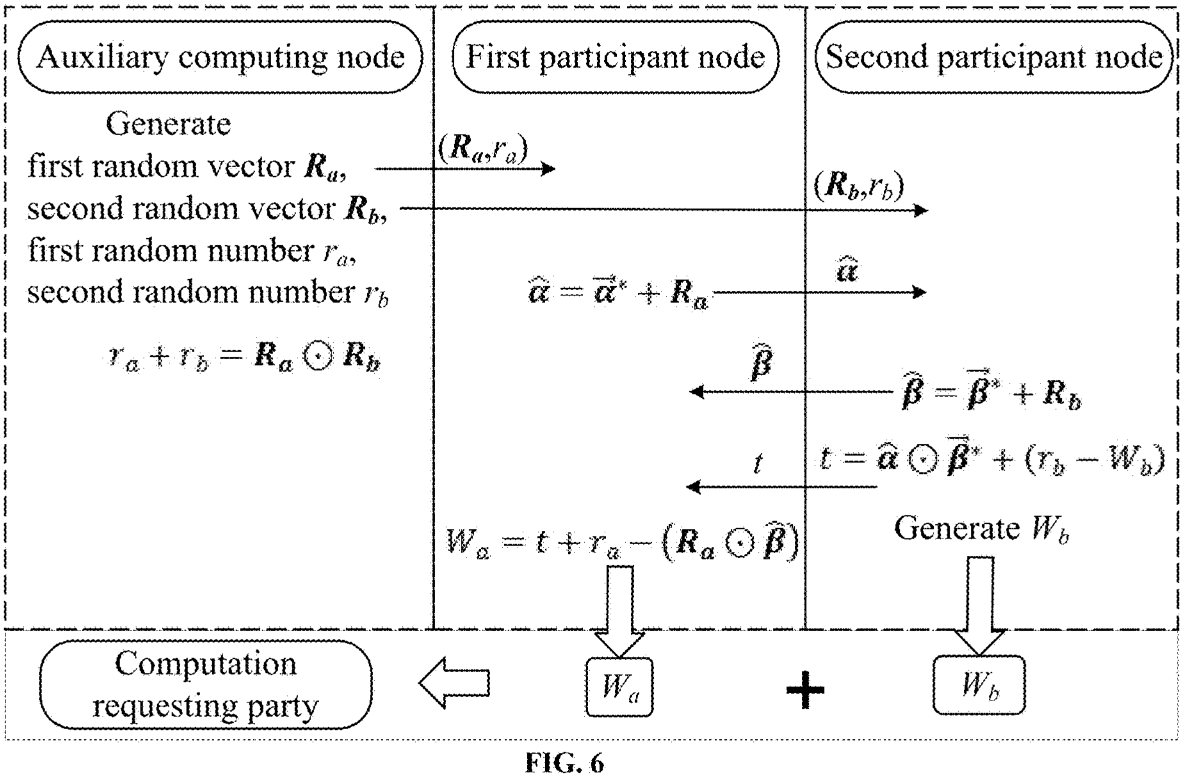
FIG. 6 is a flowchart of a secure two-party dot product computation protocol according to an embodiment of the present disclosure.

As shown in FIG. 5, it is known that there are two computation parties: the first participant node and the second participant node independent of each other and distrustful of each other. The first participant node holds an n-dimensional private vector $\vec{\alpha}^*=(\alpha_1, \alpha_2, \ldots, \alpha_n)^T$ and the second participant node holds an n-dimensional private vector $\vec{\beta}^*=(\beta_1, \beta_2, \ldots, \beta_n)^T$. The two participant nodes wish to realize $f_{S2PDP}(\vec{\alpha}^*, \vec{\beta}^*)=\vec{\alpha}^*\odot\vec{\beta}^*=W_a+W_b$ by jointly executing a secure two-party vector dot product protocol and finally each computation participant node obtains its corresponding outputs $W_a$ and $W_b$ and transmit them to the computation requesting party for aggregation to obtain its desired two-party dot product result. In the computation process, each participant node can only know its own input and output information, but cannot obtain an intermediate computation result and hold data information of other participants. As shown in FIG. 6, the procedure is as follows:

Step 21: An auxiliary computing node also known as a commodity server (CS) node generates two sets of random vector-value pairs in the specific form of a first random vector $R_a$ of dimension n, a second random vector $R_b$ of dimension n, a first random number $r_a$, and a second random number $r_b$. These random variables need to strictly meet the following constraint $r_a+r_b=R_a\odot R_b$. Then, the auxiliary computing node transmits the random vector-value pair $(R_a, r_a)$ to the first participant node, and the random vector-value pair $(R_b, r_b)$ to the second participant node.

Step 22: The first participant node internally computes a third encrypted vector $(R_a, r_a)$ after receiving the corresponding random vector-value pair $\hat{\alpha}=\vec{\alpha}^*+R_a$, and transmits it to the second participant node.

Step 23: The second participant node internally computes a fourth encrypted vector $(R_b, r_b)$ after receiving the corresponding random vector-value pair $\hat{\beta}=\vec{\beta}^*+R_b$, and transmits it to the first participant node.

Step 24: After receiving the third encrypted vector $\hat{\alpha}$ˆ transmitted from the first participant node, the second participant node internally secretly generates a random number as the second real number $W_b \in R$ and secretly computes an intermediate result $t=\hat{\alpha}\odot\vec{\beta}^*+(r_b-W_b)$ locally and transmits it to the first participant node.

Step 25: After receiving the intermediate result t, the first participant node secretly computes a first real number $W_a=t+r_a-(R_a\odot\hat{\beta})$ locally.

Step 26: The first participant node and the second participant node transmit their corresponding final obfuscated splitting results $W_a$ and $W_b$ respectively to the computation requesting party, which are summarized to obtain the final product $\vec{\alpha}^*\odot\vec{\beta}^*=W_a+W_b$.

It can be verified that $W_a+W_b=[(\hat{\alpha}\odot\vec{\beta}^*+(r_b-W_b))+r_a-(R_a\odot\hat{\beta})]+W_b=[(\vec{\alpha}^*\odot\vec{\beta}^*-W_b)+(r_a+r_b-R_a\odot R_b)]+W_b=\vec{\alpha}^*\odot\vec{\beta}^*$.

The security of the S2PDP protocol is analyzed below from two perspectives: process security and result security.

Process security: private data information held by the first participant node and the second participant node throughout the process is first categorized based on steps 21 to 26 respectively. A set of all data obtained by the first participant node based on the interaction between the first participant node and the second participant node is $\text{view}_0\{f_{S2PDP}\}=\{R_a, r_a, \vec{\alpha}^*, \hat{\alpha}, \hat{\beta}, t, W_a\}$. The first participant node owns private data $\hat{\beta}$ˆ of the second participant node, but lacks the key parameter $R_b$ for inferring vector $\vec{\beta}^*$. Therefore, it can be considered that the first participant node cannot infer input privacy information of the second participant node based on all intermediate parameter information obtained from its perspective. Similarly, from the perspective of the second participant node, which holds the data set of all intermediate computation results $\text{view}\{f_{S2PDP}\}=\{R_b, r_b, \vec{\beta}^*, \hat{\beta}, \hat{\alpha}, W_b\}$, and it is also impossible to reversely infer the private inputs $\vec{\alpha}^*$ of the first participant node based on $\hat{\alpha}$ˆ due to the lack of key information $R_a$. In conclusion, it is impossible for any participant to reversely infer any private information about the input of the other party based on information about all the intermediate computation results. Therefore, the protocol is considered to be in accordance with the process security of computation.

Result security: neither the first participant node nor the second participant node can reversely infer the original input information of the other party based on the final output information. This is because $f_{S2PDP}(\vec{\alpha}^*, \vec{\beta}^*)=W_a+W_b=\vec{\alpha}^*\odot\vec{\beta}^*$, and any participant holds only a part of the final result. For example, the first participant node has only $W_a$ but not $W_b$. Therefore, it is impossible to obtain the complete computation result, and therefore cannot infer the input information of the second participant node. In addition, even if the final result is exposed, because the final result of $\vec{\alpha}^*\odot\vec{\beta}^*$ is a value, it means that it is impossible for any the participant to obtain an exact solution to matrix equations if the coefficient matrix is not of full rank. In this case, the solution space is an infinite solution system. Therefore, the protocol is in strict accordance with the result security of computation.

In conclusion, the S2PDP protocol meets both process security and result security.

(iii) Secure Two-Party Subtraction Protocol

Figure 7:
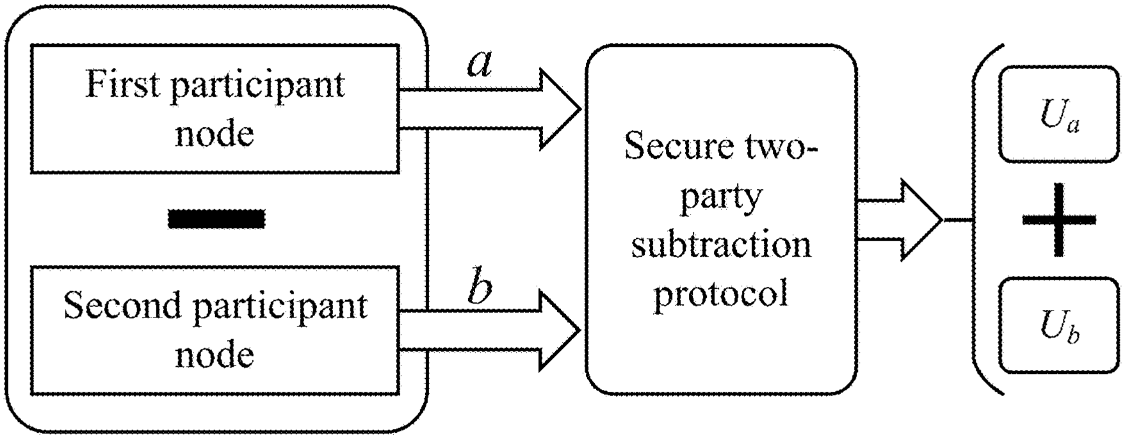
FIG. 7 is a schematic diagram of a secure two-party subtraction problem according to an embodiment of the present disclosure.
Figure 8:
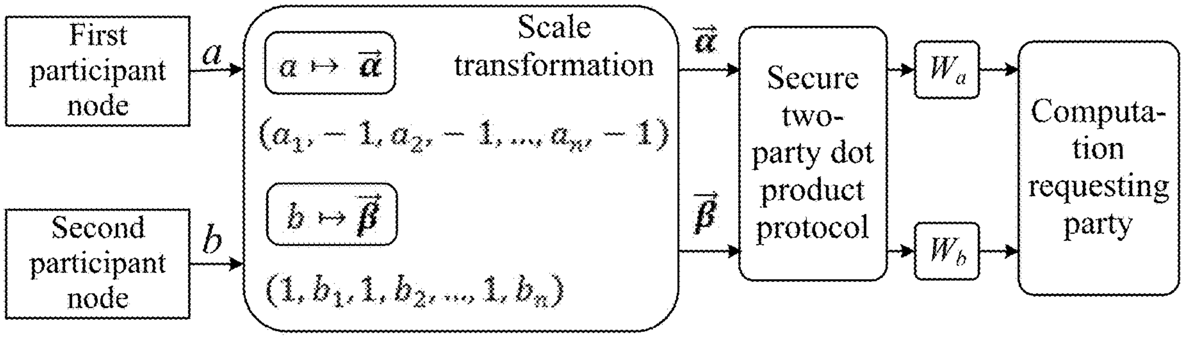
FIG. 8 is a flowchart of a secure two-party subtraction protocol according to an embodiment of the present disclosure.

As shown in FIG. 7, it is known that there are two computation parties: a first participant node and a second participant node independent of each other and distrustful of each other. The first participant node holds first private data $a \in R$ stored only in its own computing node, and the second participant node holds second private data $b \in R$ stored only in its own computing node. The two participants realize $f_{S2PS}(a, b)=a-b=U_a+U_b$ by jointly executing a secure two-party subtraction protocol, and finally each computation participant node obtains its respective corresponding output values $U_a$, $U_b$ and transmits them to the computation requesting party for aggregation to obtain the target difference. In the computation process, each participant node can know only its own input and output information, but cannot obtain an intermediate computation result and hold data information of another participant. For a formalized description of the problem, refer to FIG. 4. As shown in FIG. 8, the procedure is as follows:

Step 31: The first participant node performs scale transformation on the first private data a locally. A first multi-dimensional vector is obtained by transforming the first private data a from a one-dimensional value range $\{Dim_1: a \in R\}$ to a random vector in a 2n-dimensional vector space $\{Dim_{2n}: a \in R^{2n}\}$ through the scale transformation. The process can be formalized as $a \mapsto \vec{\alpha}=(a_1, -1, a_2, -1, \ldots, a_n, 1)^T$ or $a \mapsto \vec{\alpha}=(a_1, 1, a_2, 1, \ldots, a_n, 1)^T$ or $a \mapsto \vec{\alpha}=(1, a_1, 1, a_2, 1, \ldots, a_n)^T$, where $$\sum_{i=1}^{n} a_i = a,$$

$\vec{\alpha}$ is the first multi-dimensional vector, $Dim_1$ represents the one-dimensional numerical range, and $Dim_{2n}$ represents the 2n-dimensional vector space.

Step 32: The second participant node performs scale transformation on the second private data locally. The process is represented as a process of transforming the second private data b from a one-dimensional value space $\{Dim_1: b \in R\}$ to a random vector in the 2n-dimensional vector space $\{Dim_{2n}: \beta \in R^{2n}\}$ to obtain a second multi-dimensional vector. The process can be formalized as $b \mapsto \vec{\beta}=(1, b_1, 1, b_2, \ldots, 1, b_n)^T$ or $b \mapsto \vec{\beta}=(1, -b_1, 1, -b_2, \ldots, 1, -b_n)^T$ or $b \mapsto \vec{\beta}=(-b_1, 1, -b_2, \ldots, 1, -b_n, 1)^T$, where $$W_a + W_b =$$

$$\vec{\alpha}\odot\vec{\beta} = (a_1, -1, a_2, -1, \ldots, a_n, -1)^T \odot (1, b_1, 1, b_2, \ldots, 1, b_n)^T =$$

$$a_1 - b_1 + a_2 - b_2 + \cdots + a_n - b_n = \sum_{i=1}^{n} b_i = a - b.$$

and $\vec{\beta}$ is the second multi-dimensional vector.

Step 33: The first participant node and the second participant node execute the secure two-party dot product computation based on the secure two-party dot product protocol by inputting the transformed respective private random vectors $\vec{\alpha}$ and $\vec{\beta}$ respectively. After the execution of the S2PDP protocol is completed, the computation result is split into two random real numbers $W_a$, $W_b \in R$ based on the random obfuscation mechanism and stored in the first participant node and the second participant node respectively, and these two private output matrices meet the relation $f_{S2PDP}(\vec{\alpha}, \vec{\beta})=W_a+W_b=\vec{\alpha}\odot\vec{\beta}$.

Step 34: The first participant node and the second participant node transmit their corresponding random real numbers $W_a$ and $W_b$ respectively to the computation requesting party for aggregation to obtain the final product $a-b=\vec{\alpha}\odot\vec{\beta}=W_a+W_b$.

It can be verified that $$\sum_{i=1}^{n} b_i = b,$$

The security of the S2PS protocol is analyzed below from two perspectives: process security and result security.

Process security: first, step 31 and step 32 are both private computation processes executed locally at the first participant node and the second participant node, and the scale transformation does not involve any interaction of information between the two parties. Therefore, there is no risk of exposing the original input information. Step 33 is a collaborative computation process based on the S2PDP protocol, which has been proven process-secure, and therefore, the step does not cause any leakage of the original input information. Step 34 is the aggregation of results by the computation requesting party does not involve any participant interaction behavior, so the protocol S2PS is process-secure. leakage of the original input information, and step 34 is the process of summarizing the results by the computation requesting party, which does not involve the interaction behavior of any participant. Therefore, the protocol S2PS is in accordance with process security.

Result security: neither the first participant node nor the second participant node can reversely infer the original input information of the other party based on the final output information. This is because $f_{S2PS}(a, b)=W_a+W_b=\vec{\alpha}\odot\vec{\beta}$ and any participant holds only a part of the final result. For example, the first participant node has only $W_a$ but no $W_b$. Therefore, it is impossible to obtain the complete computation result, and therefore cannot infer the input information of the second participant node. Therefore, the protocol is in strict accordance with the result security of computation.

In conclusion, the S2PS protocol meets both process security and result security.

The beneficial effects of the present disclosure relative to the prior art include at least the following:

(1) The present disclosure proposes for the first time a privacy-preserving solution for the secure two-party subtraction problem. The key technical point is to introduce a value splitting method to realize the scale transformation of the input data. The splitting method ensures the correctness and security of the final comparison result. That is, the present disclosure proposes a secure two-party subtraction protocol based on scale transformation. The protocol realizes the conversion of input data from a low-dimensional value space to a high-dimensional vector space by decomposing and reconstructing the private data, and realizes the computation of two-party numerical subtraction in combination with the secure two-party dot product protocol. The method realizes a secure, efficient, and lightweight subtraction protocol in clever combination with the secure two-party dot product protocol. Because the computation process does not need to rely on the hosting of the third-party cloud service platform, the privacy leakage caused by the over-reliance of the cryptographic solution on the third-party platform is avoided. The method has the advantages of high computational accuracy, low communication overhead, and low computational complexity, and does not need to rely on any third-party cloud service platform, which lays the design foundation for the subsequent proposal of the secure two-party data comparison protocol.

(2) Based on the design idea of the secure two-party subtraction protocol, the present disclosure realizes the encryption of the original value by performing scale transformation and linear scaling on the input data, and only needs to call the secure two-party dot product protocol once to obtain the two-party numerical comparison result. The method solves the problems of high complexity of ciphertext computation, high communication overhead, and low availability of the existing solutions based on homomorphic encryption, secret sharing, and garbled circuits, to realize an efficient secure two-party data comparison solution.

(3) The present disclosure proposes a secure two-party data comparison protocol by introducing sign transformation and combining linear scaling, which not only ensures the consistency of subtraction signs of values before and after scale transformation, but also parallelizes the output so that the requesting party can improve the reliability of the computation result by comparing the output results of the two parties. Particularly, when the participants are the first participant node and the second participant node, the two parties can obtain the final comparison result $\delta_a$ or $\delta_b$=Sign (a−b) at the same time, which solves the problem of unfairness in the output of traditional methods, realizes the transmission of sign consistency of the two-party data comparison result and fairness, and ensures the security of "one password one time" without introducing any asymmetric secret key, and also takes into account the privacy-preserving of the two-party data comparison result and the fairness of the output. In addition, the parallel output enables the requesting parties to finally obtain the two-party data comparison results at the same time, which improves the reliability of the computation results.

(4) The present disclosure proposes a secure two-party dot product protocol in a semi-honest scenario based on a secure data obfuscation technology. The protocol reduces the computational complexity to the O(n) level compared to the existing solutions of homomorphic encryption, secret sharing, and obfuscated circuits. In addition, the number of interactions of the constant rounds (3 times) and the intermediate transmission data are real numbers, which ensures that the communication overhead costs are controlled in a low range, and takes into account the demand balance of the three impossible triangles: security, lightweight, and high efficiency. The protocol has features of lightweight, low overhead, high computational efficiency, to solve the problems of large communication overhead, high computational complexity, and low availability caused by the mixed call of the existing cryptographic solutions using technologies such as homomorphic encryption, secret sharing, oblivious transfer, and garbled circuits.

The present disclosure further provides an application scenario to which the above secure two-party data comparison method based on scale transformation is applied. Specifically, the secure two-party data comparison method based on scale transformation provided in this embodiment can be applied to a training scenario of a distributed large model. In the training scenario of a distributed large model, a plurality of different enterprises or organizations have their own private data, and in the pre-processing cleaning process of the data, the secure two-party data comparison method based on scale transformation provided in the present disclosure is used to perform data alignment on the private data owned by the plurality of different enterprises or organizations. Then, in a training stage of the distributed large model, a maximum pooling layer in a neural network is used to perform comparison on the private data owned by the plurality of different enterprises or organizations to complete the training of the entire distributed large model and improve the accuracy of the distributed large model.

Figure 9:
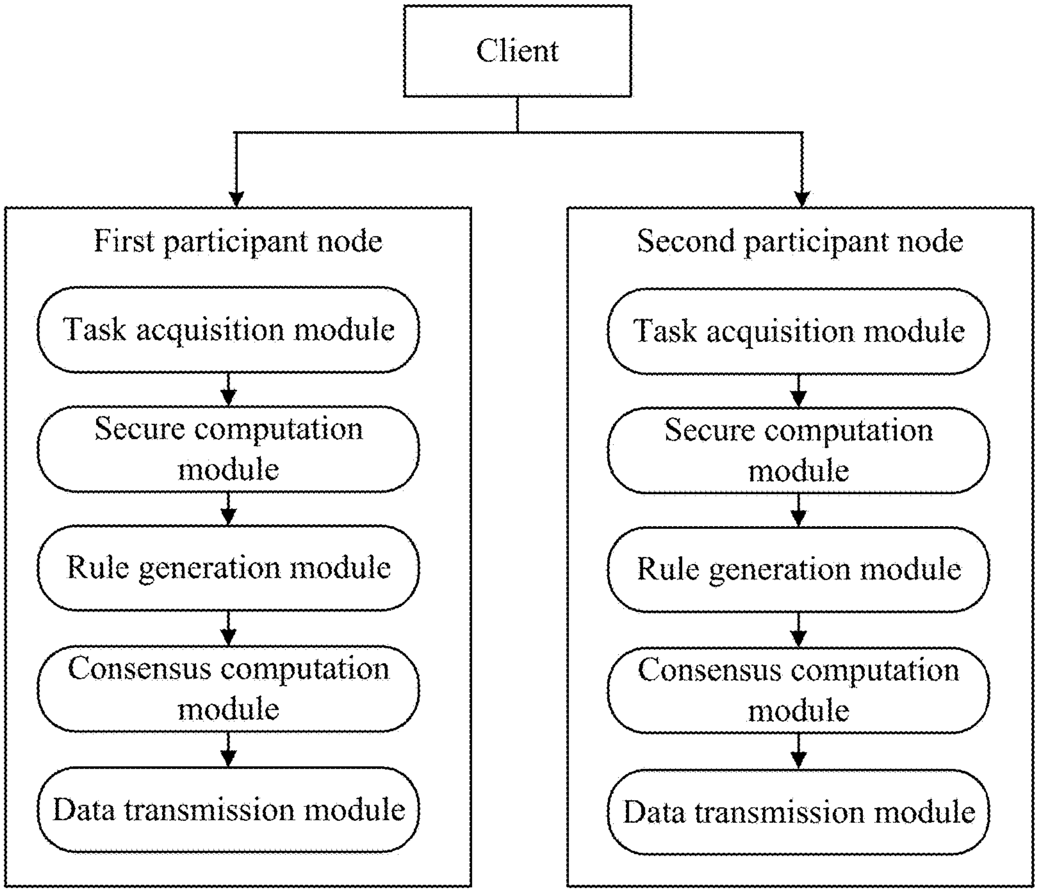
FIG. 9 is a schematic diagram of a secure two-party data comparison apparatus based on scale transformation according to an embodiment of the present disclosure.

Based on the same inventive concept, an embodiment of the present disclosure further provides an apparatus configured to implement the secure two-party data comparison method based on scale transformation described above. In an exemplary embodiment, as shown in FIG. 9, a secure two-party data comparison apparatus based on scale transformation is provided. The apparatus includes: a computation requesting party, a first participant node, and a second participant node. The first participant node holds first private data, and the second participant node holds second private data.

The computation requesting party is a client. Both the first participant node and the second participant node are nodes deployed on distributed computing service networking.

The computation requesting party is configured to transmit a two-party data comparison request to the first participant node and the second participant node.

The first participant node is configured to: perform scale transformation on the first private data to obtain a first multi-dimensional vector; perform linear scaling on the first multi-dimensional vector to obtain a first encrypted vector; and determine a first real number based on the first encrypted vector according to a secure two-party dot product protocol and share the first real number with the second participant node.

The second participant node is configured to: perform scale transformation on the second private data to obtain a second multi-dimensional vector; perform linear scaling on the second multi-dimensional vector to obtain a second encrypted vector; and determine a second real number based on the second encrypted vector according to the secure two-party dot product protocol and share the second real number with the first participant node. A sum of the first real number and the second real number is equal to a dot product of the first encrypted vector and the second encrypted vector.

The first participant node is further configured to determine a first comparison sign based on the first real number and transmit the first comparison sign to the computation requesting party.

The second participant node is further configured to determine a second comparison sign based on the second real number and transmit the second comparison sign to the computation requesting party.

The computation requesting party is further configured to determine a comparison result of the first private data and the second private data based on the first comparison sign and the second comparison sign.

In a specific example, the first participant node and the second participant node are each deployed with a distributed framework. The distributed framework includes: a task acquisition module, a secure computation module, a rule generation module, a consensus computation module, and a data transmission module.

The task acquisition module is configured to receive and decode a two-party data comparison request from a client.

The secure computation module is configured to automatically match a corresponding secure computation protocol based on the encoded two-party data comparison request.

The rule generation module is configured to implement computing task decomposition based on an asynchronous instruction set of the secure computation protocol. Different participant nodes execute collaborative computation based on their respective rules.

The consensus computation module is configured to ensure the synchronization and result consistency of the computation using a consensus protocol after receiving assigned sub-rules.

The data transmission module is configured to collect computation results from participant nodes and transmit the computation results to a computation requesting party after the computation is completed.

The specific implementation solution is as follows: An external client transmits a two-party data comparison request to a network terminal deployed with a distributed computing service through a Hypertext Transfer Protocol (HTTP) or a Google Remote Procedure Call (GRPC) Protocol. After receiving the request for numerical comparison, the task acquisition module of the node on the networking parses the request and starts a secure computing service process corresponding to the computation of the first participant node and the second participant node. When parsing the corresponding computation requirement and transferring it to the security computation module, the task acquisition module performs a joint query through its internal interface, matches the corresponding security computation protocol, and then synchronizes it to the rule generation module in the two participant nodes. The rule generation module formulates different asynchronous parallel execution processes based on the different subtasks undertaken by the two different participant nodes and communicate with the consensus computation module at each step of the execution. During execution of each computation instruction on the two participant nodes, the consensus computation module broadcasts and maintains the result consistency of the distributed computing nodes on the chain, and controls the stability of the execution process. After the final computation protocol is executed and the two participant nodes obtain the subresults of each other's computations, they transmit the sub-matrix of the results of the obfuscated splitting of the two parties to the computation requesting party through the data transmission module to obtain the correct computation results.

It should be noted that the user information (including, but not limited to, user device information, user personal information, etc.) and data (including, but not limited to, data used for analysis, data stored, data displayed, etc.) involved in the present disclosure are information and data authorized by the user or sufficiently authorized by the parties, and the collection, use and processing of the relevant data need to comply with the relevant regulations.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Several examples are used herein for illustration of the principles and implementations of the present disclosure. The description of the foregoing examples is configured to help illustrate the method of the present disclosure and the core principles thereof. In addition, a person of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A secure two-party data comparison method based on scale transformation, comprising:

transmitting, by a computation requesting party, a two-party data comparison request to a first participant node and a second participant node, wherein the first participant node holds first private data and the second participant node holds second private data;

after the first participant node and the second participant node receive the two-party data comparison request, performing, by the first participant node, a first scale transformation on the first private data to obtain a first multi-dimensional vector, and performing, by the second participant node, a second scale transformation on the second private data to obtain a second multi-dimensional vector;

performing, by the first participant node, a first linear scaling on the first multi-dimensional vector to obtain a first encrypted vector, and performing, by the second participant node, a second linear scaling on the second multi-dimensional vector to obtain a second encrypted vector;

determining, by the first participant node and the second participant node, a first real number and a second real number based on the first encrypted vector and the second encrypted vector respectively according to a secure two-party dot product protocol, specifically comprising:

generating, by an auxiliary computing node, a first random vector, a second random vector, a first random number, and a second random number, and transmitting the first random vector and the first random number to the first participant node, and the second random vector and the second random number to the second participant node, wherein a sum of the first random number and the second random number is equal to a dot product of the first random vector and the second random vector;

computing, by the first participant node, a third encrypted vector using a formula $\grave{\alpha}=\vec{\alpha}^{*}+R_a$ based on the first random vector and the first encrypted vector, and transmitting the third encrypted vector to the second participant node;

computing, by the second participant node, a fourth encrypted vector using a formula $\hat{\beta}=\vec{\beta}^{*}+R_b$ based on the second random vector and the second encrypted vector, and transmitting the fourth encrypted vector to the first participant node;

generating, by the second participant node, the second real number randomly after receiving the third encrypted vector, computing an intermediate result using a formula $t=\hat{\alpha}\odot\vec{\beta}^{*}+(r_b-W_b)$, and transmitting the intermediate result to the first participant node; and computing, by the first participant node, the first real number using a formula $W_a=t+r_a-(R_a\odot(\hat{\beta})$ after receiving the intermediate result, wherein $R_a$ is the first random vector, Rp is the second random vector, $r_a$ is the first random number, $r_b$ is the second random number, $\vec{\alpha}^{*}$ is the first encrypted vector, $\vec{\beta}^{*}$ is the second encrypted vector, $\hat{\alpha}$ is the third encrypted vector, $\hat{\beta}$ is the fourth encrypted vector, t is the intermediate result, $W_a$ is the first real number, and Wp is the second real number;

determining, by the first participant node and the second participant node, a first comparison sign and a second comparison sign respectively based on the first real number and the second real number, and transmitting the first comparison sign and the second comparison sign to the computation requesting party respectively;

wherein the determining, by the first participant node and the second participant node, the first comparison sign and the second comparison sign respectively based on the first real number and the second real number specifically comprises:

computing, by the first participant node, a first sign test variable using a formula $\sigma_a=W_a+W_b$ based on the first real number and the second real number, and determining a sign of the first sign test variable using a sign function, to obtain a first comparison sign result; and computing, by the second participant node, a second sign test variable using a formula $\sigma_b=W_a+W_b$ based on the first real number and the second real number, and determining a sign of the second sign test variable using the sign function, to obtain a second comparison sign result, wherein $\sigma_a$ is the first sign test variable, $\sigma_b$ is the second sign test variable, $W_a$ is the first real number, and $W_b$ is the second real number; and determining, by the computation requesting party, a comparison result of the first private data and the second private data based on the first comparison sign and the second comparison sign.

2. The secure two-party data comparison method based on scale transformation according to claim 1, wherein the performing, by the first participant node, the first scale transformation on the first private data to obtain a first multi-dimensional vector, and performing, by the second participant node, the second scale transformation on the second private data to obtain a second multi-dimensional vector specifically comprises:

transforming, by the first participant node, the first private data into the first multi-dimensional vector in a 2n-dimensional vector space using a formula $a\mapsto\vec{\alpha}=(a_1, -1, a_2, -1, \ldots, a_n, -1)^T$ or $a\mapsto\vec{\alpha}=(a_1, 1, a_2, 1, \ldots, a_n, 1)^T$ or $a+\grave{a}=(1, a_1, 1, a_2, 1, \ldots, a_n)^T$, wherein $$\sum_{i=1}^{n} a_i = a,$$

a is the first private data, and $\vec{\alpha}$ is the first multi-dimensional vector; and transforming, by the second participant node, the second private data into the second multi-dimensional vector in the 2n-dimensional vector space using a formula $b \mapsto \vec{\beta}=(1, b_1, 1, b_2, \ldots, 1, b_n)^T$ or $b \mapsto \vec{\beta}=(1, -b_1, 1, -b_2, \ldots, 1, -b_n)^T$ or $b \mapsto \vec{\beta}=(-b_1, 1, -b_2, \ldots, 1, -b_n, 1)^T$, wherein $$\sum_{i=1}^{n} b_i = b,$$

b is the second private data, and $\vec{\beta}$ is the second multi-dimensional vector.

3. The secure two-party data comparison method based on scale transformation according to claim 1, wherein the performing, by the first participant node, the first linear scaling on the first multi-dimensional vector to obtain a first encrypted vector, and performing, by the second participant node, the second linear scaling on the second multi-dimensional vector to obtain a second encrypted vector specifically comprises:

secretly generating, by the first participant node, a first largest number locally using a formula $k=g^x$;

performing, by the first participant node, the first linear scaling on the first multi-dimensional vector using a formula $\vec{\alpha}^*=k\vec{\alpha}$ based on the first largest number, to obtain the first encrypted vector;

secretly generating, by the second participant node, a second largest number locally using a formula $p=g^y$; and performing, by the second participant node, the second linear scaling on the second multi-dimensional vector using a formula $\vec{\beta}^*=p\vec{\beta}$ based on the second largest number, to obtain the second encrypted vector, wherein k is the first largest number, p is the second largest number, g is a random prime number jointly determined through negotiation by the first participant node and the second participant node, x is a positive number randomly selected by the first participant node, y is a positive number randomly selected by the second participant node, $\vec{\alpha}$ is the first multi-dimensional vector, and $\vec{\beta}$ is the second multi-dimensional vector.

4. The secure two-party data comparison method based on scale transformation according to claim 1, wherein the computation requesting party is a client; and both the first participant node and the second participant node are nodes deployed on distributed computing service networking.

5. The secure two-party data comparison method based on scale transformation according to claim 1, applied to a private set intersection scenario of a distributed database, a training scenario of a distributed large model, or a scenario of multi-party data classification using a decision tree model, wherein in the private set intersection scenario of a distributed database, the first participant node is a computer device owning a first private set, the second participant node is a computer device owning a second private set, the first private data is data in the first private set, and the second private data is data in the second private set; and the computation requesting party determines an intersection of the first private set and the second private set based on a comparison result of the first private data and the second private data;

in the training scenario of a distributed large model, the first participant node is a computer device owning a first training sample set, the second participant node is a computer device owning a second training sample set, the first private data is a sample in the first training sample set, and the second private data is a sample in the second training sample set; and the computation requesting party performs data alignment on the sample in the first training sample set and the sample in the second training sample set based on a comparison result of the first private data and the second private data, to train the distributed large model based on the samples after data alignment; and in the scenario of multi-party data classification using a decision tree model, the first participant node is a computer device owning a first to-be-classified data set, the second participant node is a computer device owning a second to-be-classified data set, the first private data is data in the first to-be-classified data set, and the second private data is data in the second to-be-classified data set; and the computation requesting party classifies the data in the first to-be-classified data set and the data in the second to-be-classified data set based on a comparison result of the first private data and the second private data.

6. A secure two-party data comparison apparatus based on scale transformation comprising: a computation requesting party, a first participant node, and a second participant node, wherein the first participant node holds first private data, and the second participant node holds second private data;

the computation requesting party is configured to transmit a two-party data comparison request to the first participant node and the second participant node;

the first participant node is configured to: perform a first scale transformation on the first private data to obtain a first multi-dimensional vector; perform a first linear scaling on the first multi-dimensional vector to obtain a first encrypted vector; and determine a first real number based on the first encrypted vector according to a secure two-party dot product protocol and share the first real number with the second participant node;

the second participant node is configured to: perform a second scale transformation on the second private data to obtain a second multi-dimensional vector; perform a second linear scaling on the second multi-dimensional vector to obtain a second encrypted vector; and determine a second real number based on the second encrypted vector according to the secure two-party dot product protocol and share the second real number with the first participant node, wherein a sum of the first real number and the second real number is equal to a dot product of the first encrypted vector and the second encrypted vector;

the first participant node is further configured to determine a first comparison sign based on the first real number and transmit the first comparison sign to the computation requesting party;

the second participant node is further configured to determine a second comparison sign based on the second real number and transmit the second comparison sign to the computation requesting party; and the computation requesting party is further configured to determine a comparison result of the first private data and the second private data based on the first comparison sign and the second comparison sign.

7. The secure two-party data comparison apparatus based on scale transformation according to claim 6, wherein the computation requesting party is a client; and both the first participant node and the second participant node are nodes deployed on distributed computing service networking.

8. The secure two-party data comparison apparatus based on scale transformation according to claim 6, wherein the first participant node and the second participant node are each deployed with a distributed framework.

9. The secure two-party data comparison apparatus based on scale transformation according to claim 6, wherein the performing, by the first participant node, the first scale transformation on the first private data to obtain a first multi-dimensional vector, and performing, by the second participant node, the second scale transformation on the second private data to obtain a second multi-dimensional vector specifically comprises:

transforming, by the first participant node, the first private data into the first multi-dimensional vector in a 2n-dimensional vector space using a formula $a \mapsto \vec{\alpha}=(a_1, -1, a_2, -1, \ldots, an, -1)$ or $a \mapsto \vec{\alpha}=(a_1, 1, a_2, 1, \ldots, a_n, 1)^T$ or a $a \mapsto \vec{\alpha}=(1, a_1, 1, a_2, 1, \ldots, a_n)^T$, wherein $$\sum_{i=1}^{n} a_i = a,$$

a is the first private data, and $\vec{\alpha}$ is the first multi-dimensional vector; and transforming, by the second participant node, the second private data into the second multi-dimensional vector in the 2n-dimensional vector space using a formula $b \mapsto \vec{\beta}=(1, b_1, 1, b_2, \ldots, 1, b_n)^T$ or $b \mapsto \vec{\beta}=(1, -b_1, 1, -b_2, \ldots, 1, -b_n)^T$ or $b \mapsto \vec{\beta}=(-b_1, 1-b_2, \ldots, 1, -b_n, 1)^T$, wherein $$\sum_{i=1}^{n} b_i = b,$$

b is the second private data, and $\vec{\beta}$ is the second multi-dimensional vector.

10. The secure two-party data comparison apparatus based on scale transformation according to claim 6, wherein the performing, by the first participant node, the first linear scaling on the first multi-dimensional vector to obtain a first encrypted vector, and performing, by the second participant node, the second linear scaling on the second multi-dimensional vector to obtain a second encrypted vector specifically comprises:

secretly generating, by the first participant node, a first largest number locally using a formula $k=g^x$;

performing, by the first participant node, the first linear scaling on the first multi-dimensional vector using a formula $\vec{\alpha}^*=k\vec{\alpha}$ based on the first largest number, to obtain the first encrypted vector;

secretly generating, by the second participant node, a second largest number locally using a formula $p=g^y$; and performing, by the second participant node, the second linear scaling on the second multi-dimensional vector using a formula $\vec{\beta}^*=p\vec{\beta}$ based on the second largest number, to obtain the second encrypted vector, wherein k is the first largest number, p is the second largest number, g is a random prime number jointly determined through negotiation by the first participant node and the second participant node, x is a positive number randomly selected by the first participant node, y is a positive number randomly selected by the second participant node, $\vec{\alpha}$ is the first multi-dimensional vector, and $\vec{\beta}$ is the second multi-dimensional vector.

11. The secure two-party data comparison apparatus based on scale transformation according to claim 6, applied to a private set intersection scenario of a distributed database, a training scenario of a distributed large model, or a scenario of multi-party data classification using a decision tree model, wherein in the private set intersection scenario of a distributed database, the first participant node is a computer device owning a first private set, the second participant node is a computer device owning a second private set, the first private data is data in the first private set, and the second private data is data in the second private set; and the computation requesting party determines an intersection of the first private set and the second private set based on a comparison result of the first private data and the second private data;

in the training scenario of a distributed large model, the first participant node is a computer device owning a first training sample set, the second participant node is a computer device owning a second training sample set, the first private data is a sample in the first training sample set, and the second private data is a sample in the second training sample set; and the computation requesting party performs data alignment on the sample in the first training sample set and the sample in the second training sample set based on a comparison result of the first private data and the second private data, to train the distributed large model based on the samples after data alignment; and in the scenario of multi-party data classification using a decision tree model, the first participant node is a computer device owning a first to-be-classified data set, the second participant node is a computer device owning a second to-be-classified data set, the first private data is data in the first to-be-classified data set, and the second private data is data in the second to-be-classified data set; and the computation requesting party classifies the data in the first to-be-classified data set and the data in the second to-be-classified data set based on a comparison result of the first private data and the second private data.

* * * * *